Nov. 8, 1955 P. MESHBERG 2,722,833
DEVICE FOR MEASURING STOPPING DISTANCES
Filed March 23, 1953 2 Sheets-Sheet 1
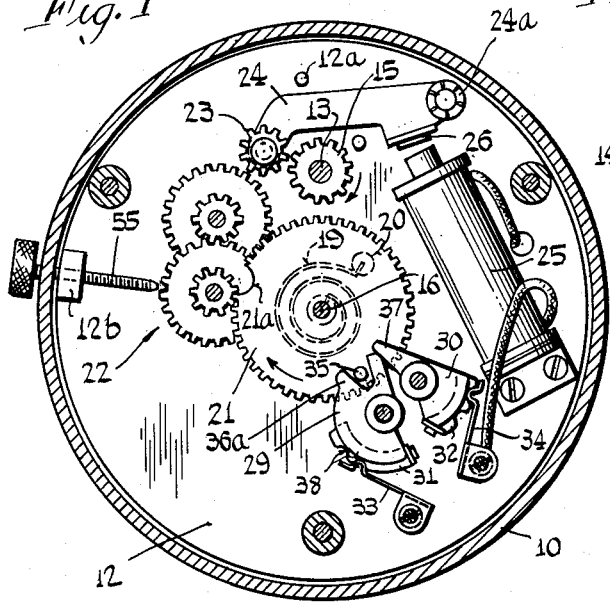
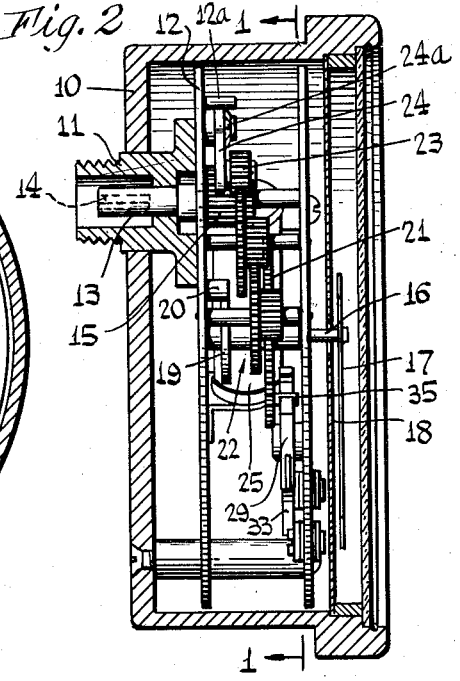
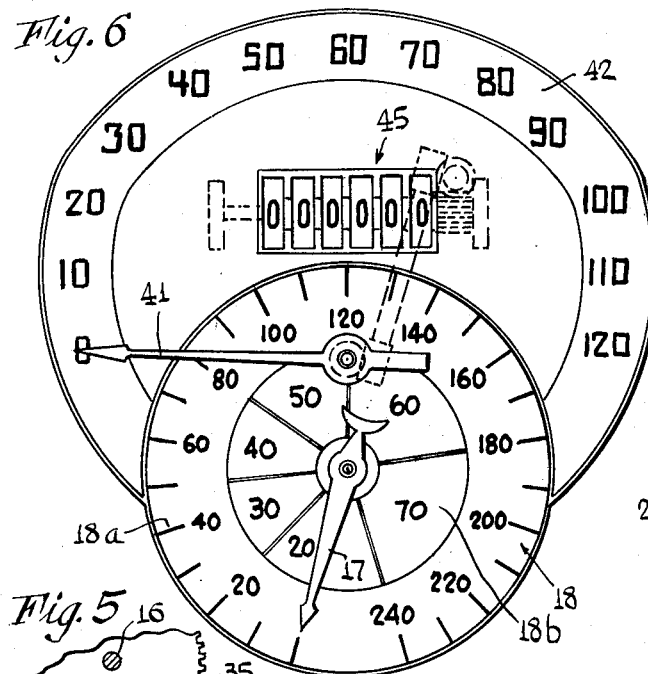
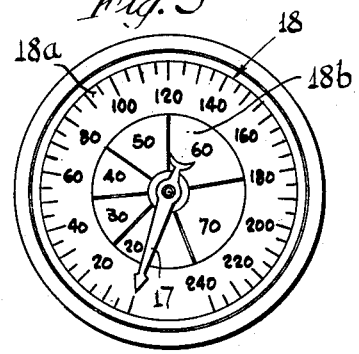
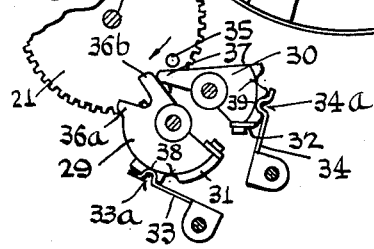
INVENTOR
*Philip Meshberg*
BY *Johnson and Kline*
ATTORNEYS Nov. 8, 1955     P. MESHBERG     2,722,833
DEVICE FOR MEASURING STOPPING DISTANCES
Filed March 23, 1953     2 Sheets-Sheet 2

INVENTOR
Philip Meshberg
BY Johnson and Kline
ATTORNEYS

United States Patent Office 2,722,833
Patented Nov. 8, 1955

2,722,833

DEVICE FOR MEASURING STOPPING DISTANCES

Philip Meshberg, Fairfield, Conn.

Application March 23, 1953, Serial No. 343,933

14 Claims. (Cl. 73—128)

This invention relates to an improvement of a testing device for use on automobiles or the like vehicles by which the travel distance of said automobile or the like vehicle may be accurately indicated after the stopping means for said vehicle has been applied.

The present invention is an improvement on my Patents Nos. 2,192,602, granted March 5, 1940, and 2,298,065, granted October 6, 1942. An object of the present invention resides in providing a device which is of simplified construction and one which is more compact and less expensive to manufacture.

Another object of the present invention is to provide a device in which once the brakes have been applied will continue to register even though the foot may be removed from the brake pedal momentarily and again applied as is the case when a pumping action is used to unbrake the pedal. This is accomplished by providing a holding circuit in the device which will maintain the device operative until the wheels have traveled through a predetermined distance, which distance is so arranged that all normal stopping will be accomplished within the same.

In simplifying the present invention there is employed in one form thereof a simple spur gear drive including a gear clutch member which greatly reduces the size of the unit. In another form of the invention a magnetic clutch is employed to drive the structure.

Under some circumstances it may be desired to provide a lock which may secure the indicator in its indicating position at the end of the stopping operation and prevent the same from being reset as in cases where it is desired to use the indication as evidence. This is accomplished by providing a locking screw in the housing for clamping the indicator mechanism in the stopped position.

While the device of the present invention is electrically controlled in accordance with the application of the stopping means, in the preferred form of the invention it is connected in series with the stop light switch so that as soon as the brakes are applied and the circuit to the stop light energized the indicating device will be energized to indicate the number of feet traveled until the vehicle is stopped. Should the taillight be burned out, this would be indicated by a failure of the device to record the stopping distance. Switch means may be provided to shunt the device out of the taillight circuit should it be desired to render the device inoperative.

Also, if desired, in accordance with the present invention, means may be provided for indicating when the device is energized so that should the brakes for some reason fail to operate as soon as expected the indicator will show the lag in operation of the device.

Any suitable dial may be employed, but it is at present preferred to employ a dial calibrated to show an accepted relation between stopping distance and speed of vehicle so that the operator can readily determine whether the brakes are adequate to stop the vehicle in the required distance for the speed in which it is traveling. This also makes the driver conscious of stopping distances and their relation to the speed of travel of the vehicle, tending to make the driver a safer driver.

The device of the present invention may be embodied in a single unit or in a combination unit with a speedometer.

Other features and advantages of the invention will be apparent from the specification and claims when considered in connection with the drawings in which:

Figure 1 shows a sectional view of the device taken along line 1—1 of Fig. 2.

Fig. 2 is a longitudinal sectional view of the device.

Fig. 3 is a front view showing the dial and indicator relationship.

Fig. 4 is a fragmentary view of the switch mechanism in the holding circuit with the switches in closed position.

Fig. 5 is a view similar to Fig. 4 with the switch in position in which the circuit is broken at the end of the predetermined distance.

Fig. 6 is a front view of a speedometer and "stopometer" combination.

Figure 7:
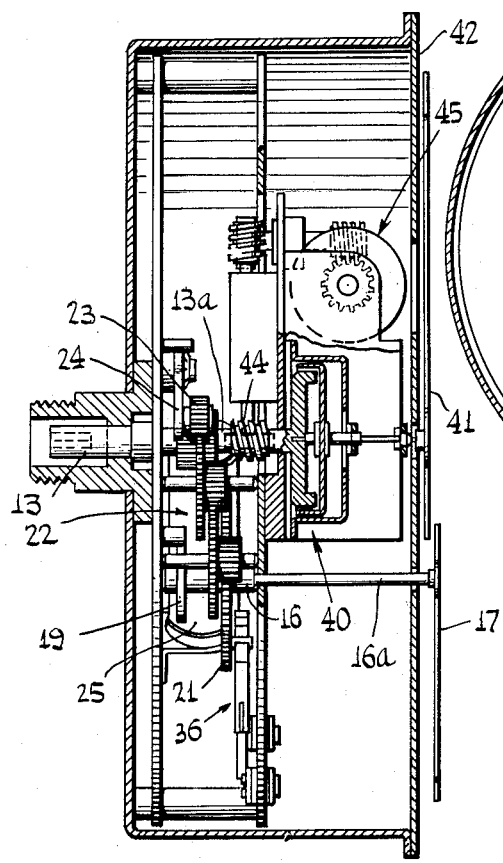
Fig. 7 is a longitudinal sectional view of the device of Fig. 6.

As shown in Figs. 1 and 2, the device of the present invention comprises a housing 10 having a threaded nipple 11 thereon for connection to a housing for a wheel driven shaft such as a speedometer cable or the like (not shown). Rotatably mounted within the threaded nipple and carried by a mounting plate 12 is a drive shaft 13 having a connection 14 for the wheel driven shaft (not shown) and a driving gear 15. Also mounted on the mounting plate 12 in the housing is a rotary member or shaft 16 having a pointer or indicator 17 thereon cooperating with a dial 18.

While the dial may have any desired indicia thereon to indicate the traveled distance, in the prefered form of the invention as shown in Fig. 3, it is provided with an outer distance scale 18a indicating feet traveled and an inner scale 18b showing speed zones related to the distance scale so that one may determine whether or not the vehicle stops within a predetermined distance for a given speed, thus giving the operator an opportunity to quickly check the operation of his stopping equipment. For example, if the operator is traveling 30 miles per hour and the stopping distance is 20 feet then he knows that his stopping means are in top condition; if the stopping distance is 50 feet then he knows that his stopping means are in a minimum acceptable condition; and if the stopping distance is more than 50 feet then he knows that his stopping means is not safe and should be repaired or adjusted to become more effective.

The rotary member has secured thereto one end of a reset spring 19, the other end of which is connected to post 20 which spring acts to return the rotary member and the indicator to a zero position as shown in Figs. 1 and 3.

The rotary member is rotated by a mutilated gear 21 connected to a reduction gearing mechanism 22. As shown in Fig. 1 the mutilated portion 21a is so positioned that it limits the rotary member and the pointer carried thereby to less than a full revolution. The reduction gearing is such that the permitted rotation of the member 16 will include the maximum safe stopping distance. The limiting of the rotation of the member 16 also prevents any damage to the reset spring 19 by overwinding.

When it is desired to actuate the indicator, the reduction gearing 22 is connected to the driving gear 15 as an incident to the actuation of the stoping means for the vehicle. This is accomplished in the form of the invention shown in Figs. 1 and 2 by providing a gear 23 carried by the outer end of the arm 24 pivotally mounted on the plate 12. The arm extends over an electromagnet 25 and has an armature 26 adapted to cooperate with the electromagnet, when energized, to move the arm and gear 23 into position wherein the gear connects the drive gear 15 to the reduction gearing 22. The electromagnet is connected in an electrical circuit and is energized in response to the application of the stopping means or brakes for the vehicle.

Figure 10:
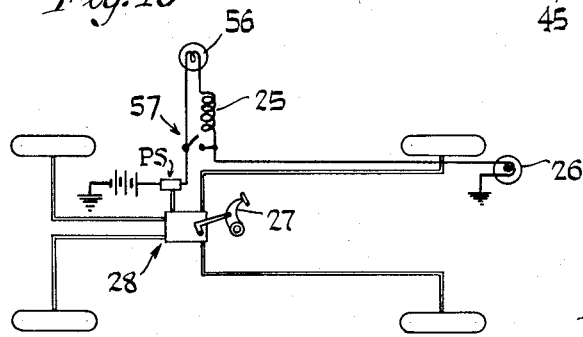
Fig. 10 is a diagrammatic showing of the connection of the "stopometer" to the brake system of an automobile.

While the electromagnet may be controlled by any suitable switch means actuated by the brake pedal as suggested in my prior patents, it is at present preferred to connect the circuit for the electromagnet in the stop light circuit as shown in Fig. 10 so that the solenoid is in series with the stop light 26. Thus, when the brake pedal 27 is actuated to produce pressure in the brake lines 28 sufficient to produce braking action, this pressure will cause the pressure switch PS to close the circuit to the stop light and at the same time energize the electromagnet 25 to move gear 23 into operative position and start the measuring operation. This arrangement not only gives a convenient connection for the electrical circuit of the device of the present invention since the same may be connected to the existing pressure switch, but it also gives a check to the operator of the operation of the stop light for if the stop light bulb is burned out the circuit will be opened. Thus when the brakes are applied to stop the vehicle, the electromagnet 25 will be energized causing the arm to pivot downwardly as shown in Fig. 1, and to move the clutch gear into engagement with the drive gear 15 and reduction gearing 22, thus completing the drive to the rotary member.

While a spring may be used to rotate the arm 24 about the pivot therefor to unclutching position, if desired, I have found that when the electromagnet is de-energized continued rotation of the drive gear 15 will tend to throw the clutch gear 23 and arm upwardly to a release position, as shown in Fig. 1, out of engagement with the reduction gearing. A stop pin 12a may be provided to limit the throw-out of the arm. If desired, a friction washer 24a can be provided at the pivot for the arm 24 to prevent the arm from inadvertently moving into clutching position.

In order to make the device effective for such cases where the brakes are not applied by steady pressure on the pedal but by a series of braking applications in quick succession as when "pumping" of the brakes is employed, the present invention provides a holding circuit for the electromagnet which will maintain the electromagnet energized until the indicator has moved through a required distance, which distance as noted above is more than is required for the normal stopping of the vehicle. While this may take many forms, it is herein illustrated as comprising switch means actuated as an incident to the movement of the rotary member from its zero position, which switch means maintains the circuit to the electromagnet closed until the indicator has moved through a full extent of movement, whereupon the switch means opens the holding circuit and permits the clutch gear to be released and the device reset to zero. In the form of the invention the switch means comprises a pair of pivotally mounted contact carrying members 29, 30 having contacts 31, 32 insulatedly carried thereon and connected through wiping contacts 33, 34 connected in the holding circuit. The rotary member is provided with a switch operating pin 35 which cooperates with a forked extension 36 on the contact carrying member 29 and is normally positioned as shown in Fig. 1 in which the contact carrying members are positioned in their normal initial open-circuit position. It will be seen that as the rotary member moves in the direction of the arrow of Fig. 1, it will engage the portion 36a and pivot the member 29 moving the contacts 31, 32 into engagement as shown in Fig. 4. The circuit will be maintained closed until the switch operator 35 has completed its movement at which point it engages the actuating means 37 of the pivoted contact carrier 30 as shown in Fig. 5 causing the contact to be moved to open-circuit position wherein the holding circuit is broken. As soon as the clutch gear releases the reduction gearing, the return spring 19 will return the rotary member to the position shown in Fig. 1 in which the switch operator 35 will pass the actuating portion 36a and engage the actuating portion 36b of the first pivoted member causing it to move to the position shown in Fig. 1 and in this position it will be noted that the end of the member 36b will engage the actuating member 37 of the other pivoted member to return it from the position of Fig. 5 to the position of Fig. 1.

If desired the wiping contacts can be formed with detent portions 33a, 34a to engage notches 38, 39 on the pivoted members to hold them in their several positions as shown in Figs. 1, 4 and 5.

In some instances it may be desired to provide a combined instrument embodying a "stopometer" as above described in conjunction with a speedometer. One such arrangement is shown in Figs. 6 and 7 wherein the drive shaft 13 is extended beyond the driving gear 15 and is drivingly connected to the speedometer drive 40 which moves the indicator or pointer 41 over the dial 42. The extension 13a is provided with a worm 44 from which the odometer 45 of the speedometer is driven. In the present preferred form of the invention the rotary member 16 of the "stopometer," it will be noted, is disposed below the speedometer mechanism and is extended at 16a so that the indicator 17 thereon projects through the front dial 42 and operates in a plane in front of the indicator of the speedometer as shown in Fig. 7 so that there will be no interference in the movement of the indicators over the scales on the dial 42 which as shown in Fig. 6 are arranged to give the operator in a single glance all of the information necessary to test the stopping properties of the vehicle.

Figure 8:
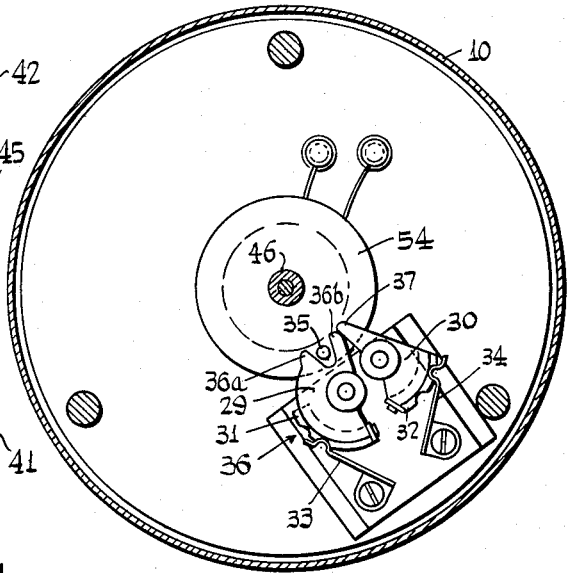
Fig. 8 is a sectional view taken along line 8—8 of Fig. 9 showing another form of the invention.
Figure 9:
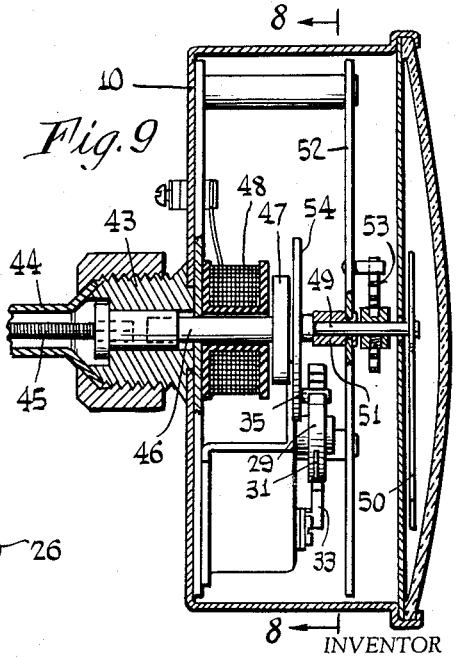
Fig. 9 is a longitudinal sectional view of the form of the invention shown in Fig. 8.

In the form of the invention shown in Figs. 8 and 9, there is provided on the housing 10 the threaded nipple 43 to which is connected the cable casing 44 having cable 45 driven from the suitable reduction gearing mechanism (not shown). The end of the cable is connected to the drive shaft 46 having a magnetizable disk 47 at its inner end and a magnetizing coil 48 for the disk surrounding the shaft as shown in Fig. 9. A rotary member 49 aligned with the drive shaft and having the indicator 50 thereon is mounted for rotation in a bearing 51 in the supporting plate 52 and has a return spring 53 as in the other form of the invention. The other end of the rotary member is provided with a disk 54 of magnetizable material which is located in slightly spaced relation with respect to the disk 47 of the drive shaft so that when the coil 48 is energized a magnetic clutch is formed between disk 47 and disk 54 to rotate the rotary member through a predetermined distance. A holding circuit for the coil 48 is provided and controlled by the pivoted contact carrying members 29, 30 in the manner described above with the switch operator 35 on the disk 54 actuating the members 29, 30 in the manner set forth above.

When the rotary member has moved its predetermined distance the switch operator 35 will engage the actuating member 37 and its rotation will be arrested after the switch has been moved to open-circuit position. The magnetic clutch will permit slippage between the disks 47, 54 and prevent damage to the switch contacts.

As soon as the rotary member has moved through a predetermined distance and has opened the shunt circuit, it may be returned, upon deenergization of the coil 48 by the return spring 53.

Under some circumstances it may be desired to lock the device in stopped position to fix the indication thereof so that it may be used in evidence or for other similar reasons. This may be accomplished, as shown in Fig. 1, by providing a manually operable threaded member 55 threaded into a lug 12b on the supporting plate and having an end turned into engagement with the teeth of the gears of the reduction gear to prevent the same from turning and thus holding the rotary member against rotation.

Also, if desired, indicator means may be provided in the electrical circuit for the device of the present invention to indicate when the electromagnet or magnetic coil is energized. This, in the illustrated form of the invention, comprises a signal light 56, as shown in Fig. 10, which may be mounted in the housing or on the dashboard where it may be viewed by the operator to inform him when the electromagnet or magnetic coil is energized to start the measurement of the distance. Thus, if the operator applies his brakes and the indicator does not come on within a reasonable time he will be aware that the "stopometer" is not properly functioning. The circuit to the "stopometer" may be provided with a switch 57, as shown in Fig. 10, by which the "stopometer" can be shunted out of the stop light circuit when desired.

From the foregoing it will be seen that I have provided a simple, yet effective device for indicating stopping distances during a stopping operation.

Inasmuch as substantially all of the device may be made by stampings, the cost will be greatly reduced and a compact device of simple construction will be obtained.

It will be apparent that the device of the present invention will tend to produce safer operation of the vehicle since it will enable one to be apprised of the condition of the stopping mechanism, it will be a continual reminder to the operator of the safe stopping distance and it will give him a means whereby he can spot test the operation of the stopping means quickly and easily so as to determine the condition thereof.

Variations and modifications may be made within the scope of the claims and portions of the improvements may be used without others.

I claim:

1. A device for connection to a rotatable wheel driven shaft in a vehicle for indicating the distance the vehicle has traveled after the stopping means therefor has been applied comprising a housing; drive means on the housing adapted to be connected to said shaft to be driven thereby; a rotary indicating member mounted on the housing and having an indicating member; return spring means connected to the rotary member to return the member to a predetermined zero position; electrically controlled means actuated by the application of the stopping means and connecting the drive means to the rotary member to drive the rotary member thereby; and switch means in the circuit of the electrically controlled means and actuated in response to movement of the rotary member from said predetermined position for maintaining the electrically controlled means energized until said rotary member has moved through a desired distance.

2. A device for connection to a rotatable wheel driven shaft in a vehicle for indicating the distance the vehicle has traveled after the stopping means therefor has been applied comprising a housing; drive means on the housing adapted to be connected to said shaft to be driven thereby; a rotary indicating member mounted on the housing and having an indicating member; return spring means connected to the rotary member to return the member to a predetermined zero position; electrically controlled means actuated by the application of the stopping means and connecting the drive means to the rotary member to drive the rotary member thereby; locking means on the housing for locking the rotating means in stopped position to indicate the stopping distance; and switch means in the circuit of the electrically controlled means and actuated in response to movement of the rotary member from said predetermined position for maintaining the electrically controlled means energized until said rotary member has moved through a desired distance.

3. A device for connection to a rotatable wheel driven shaft in a vehicle for indicating the distance the vehicle has traveled after the stopping means therefor has been applied comprising a housing, drive means on the housing adapted to be connected to said shaft to be driven thereby; a rotary member mounted on the housing and having an indicating member; return spring means connected to the rotary member to return the member to a predetermined zero position; electrically controlled means having a circuit therefor energized in response to the application of the stopping means and connecting the drive means to the rotary member to drive the rotary member thereby; an indicator means mounted in the housing and connected in the circuit of the electrically controlled means to indicate when the same is energized; and switch means in the circuit for the electrically controlled means and actuated in response to movement of the rotary member from said predetermined position for maintaining the electrically controlled means energized until said rotary member has moved through a desired distance.

4. A device for connection to a rotatable wheel driven shaft in a vehicle for indicating the distance the vehicle has traveled after the stopping means therefor including a stop light and a circuit therefor has been applied comprising a housing; drive means on the housing adapted to be connected to said shaft to be driven thereby; a rotary member mounted on the housing and having an indicating member; return spring means connected to the rotary member to return the member to a predetermined zero position; electrically controlled means connected in series with the stop light actuated by the application of the stopping means and the energizing of the stop light, said electrically controlled means, when energized, connecting the drive means to the rotary member to drive the rotary member thereby; and switch means in the circuit of the electrically controlled means and actuated in response to movement of the rotary member from said predetermined position for maintaining the electrically controlled means energized until said rotary member has moved through a desired distance.

5. A device for connection to a rotatable wheel driven shaft in a vehicle for indicating the distance the vehicle has traveled after the stopping means therefor has been applied comprising a housing, drive means on the housing adapted to be connected to said shaft to be driven thereby; a rotary member mounted on the housing and having a switch operator and an indicating member thereon and movable therewith; return spring means connected to the rotary member to return the member to a predetermined zero position; electrically controlled means having a circuit energized by the application of the stopping means and connecting the drive means to the rotary member to drive the rotary member thereby; and switch means in the circuit for the electrically controlled means and comprising a pair of pivoted contact carrying members, each having actuating means engaged by said switch operator, the actuating means on one member being engaged in response to movement of the rotary member from said predetermined position and moving the contacts into engagement and closing a holding circuit to the electrically controlled means to maintain said means energized until said rotary member has moved through a desired distance whereupon said switch operator engages the actuating means on the other member to move the contacts to open-circuit position enabling the return spring to return the rotary member to zero position, the switch operator during the return acting upon said actuating means to reset the contact carrying members for a subsequent cycle of operation.

6. A device for connection to a rotatable wheel driven shaft in a vehicle for indicating the distance the vehicle has traveled after the stopping means therefor has been applied comprising a housing; a drive gear on the housing adapted to be connected to said shaft to be driven thereby; a rotary member mounted on the housing and having a gear and indicating means; return spring means connected to the rotary member to return the member to a predetermined zero position; reduction gearing connected to the gear on the rotary member; a clutch gear movable from a retracted position into engagement with the drive gear and the reduction gearing; electrically controlled means actuated by the stopping means and moving the clutch gear to engaging position to drive the rotary member from the drive gear when the stopping means is actuated; and switch means in the circuit for the electrically controlled means and actuated by means on the rotary member in response to movement of the rotary member from said predetermined position for maintaining the electrically controlled means energized until said rotary member has moved through a desired distance.

7. A device for connection to a rotatable wheel driven shaft in a vehicle for indicating the distance the vehicle has traveled after the stopping means therefor has been applied comprising a housing; a drive gear on the housing adapted to be connected to said shaft to be driven thereby; a rotary member mounted on the housing and having a gear and indicating means; return spring means for the rotary member to return the member to a predetermined zero position; reduction gearing connected to the gear on the rotary member; a pivoted arm having a clutch gear mounted adjacent one end thereof and movable from a retracted position into a driving position engaging the drive gear and the reduction gearing; electromagnetic means actuated by the stopping means and acting on the arm to move the clutch gear to engaging position to drive the rotary member from the drive gear when the stopping means is actuated; and switch means in the circuit for the electromagnetic means and actuated by means on the rotary member in response to movement of the rotary member from said predetermined position for maintaining the electromagnetic means energized until said rotary member has moved through a desired distance.

8. A device for connection to a rotatable wheel driven shaft in a vehicle for indicating the distance the vehicle has traveled after the stopping means therefor has been applied comprising a housinng; a drive gear on the housing adapted to be connected to said shaft to be driven thereby; a rotary member mounted on the housing and having thereon a mutilated gear and indicating means; return spring means connected to the rotary member to return the member to a predetermined zero position, said mutilated gear limiting rotation of the rotary member to less than one full revolution; reduction gearing connected to the gear on the rotary member; a clutch gear movable from a retracted postion into engagement with the drive gear and the reduction gearing; electromagnetic means actuated by the stopping means and adapted to move the clutch gear into engaging position to drive the rotary member from the drive gear when the stopping means is actuated, rotation of the clutch gear by the drive gear upon deenergization of the electromagnetic means causing said clutch gear to be thrown out of engagement with said reduction gear and permitting the return spring to reset the indicator to zero; and switch means in the circuit for the electromagnetic means and actuated by means on the rotary member in response to movement of the rotary member from said predetermined position for maintaining the electromagnetic means energized until said rotary member has moved through a desired distance.

9. A device for connection to a rotatable wheel driven shaft in a vehicle for indicating the distance the vehicle has traveled after the stopping means therefor has been applied comprising a housing, drive means including a magnetic clutch mounted on the housing and adapted to be connected to said shaft to be driven thereby; a rotary indicating member mounted on the housing and having thereon a disk of magnetizable material to be magnetically coupled to the magnetic clutch and indicating means; return spring means for the rotary member to return the member to a predetermined zero position; electrically controlled means actuated by the stopping means and energizing the magnetic clutch of the drive means to couple the disk of the rotary member thereto for rotation therewith when the stopping means is actuated; and switch means connected in the circuit for the magnetic clutch and actuated in response to movement of the rotary member from said predetermined position for maintaining the magnetic clutch energized until said rotary member has moved through a desired distance.

10. A device for indicating the speed of a vehicle and the distance the vehicle has traveled after the stopping means for the vehicle has been applied comprising a housing, a speedometer mounted in the housing and adapted to be connected to and driven by a rotatable wheel driven shaft in the vehicle; drive means on the housing driven in synchronism with said speedometer; a rotary member having indicating means mounted in the housing laterally of the speedometer and having return spring means to return the member to a predetermined zero position; electrically controlled means actuated by the stopping means and drivingly connecting the drive means to the rotary member when the stopping means is actuated to rotate the rotary member thereby whereby stopping distances for various vehicle speeds may be determined; and switch means in the circuit for the electrically controlled means and actuated in response to movement of the rotary member from said predtermined position for maintaining the electrically controlled means energized until said rotary member has moved through a desired distance.

11. A device for connection to a rotatable wheel driven shaft in a vehicle for indicating the distance the vehicle has traveled after the stopping means therefor has been applied comprising a housinng, drive means on the housing adapted to be connected to said shaft to be driven thereby; a rotary indicating member mounted on the housing and having indicating means; return spring means connected to the rotary member to return the member to a predetermined zero position; electrically controlled means connected to a circuit adapted to be closed by the application of the stopping means and connecting the drive means to the rotary member to drive the rotary member thereby; and switch means in the circuit for the electrically controlled means and actuated in response to movement of the rotary member from said predetermined position for maintaining the electrically controlled means energized until said rotary member has moved through a desired distance.

12. A device for connection to a rotatable wheel driven shaft in a vehicle for indicating the distance the vehicle has traveled after the stopping means therefor has been applied comprising a housing; a drive gear on the housing adapted to be connected to said shaft to be driven thereby; a rotary member mounted on the housing and having a mutilated gear and indicating means; return spring means for the rotary member to return the member to a predetermined zero position; reduction gearing connected to the gear on the rotary member; a clutch gear movable from a retracted position into engagement with the drive gear and the reduction gearing, said mutilated gear limiting the rotation of the rotary member to less than one revolution; and electrically controlled means actuated by the stopping means and moving the clutch gear to engaging position to drive the rotary member from the drive gear when the stopping means is actuated.

13. A device for connection to a rotatable wheel driven shaft in a vehicle for indicating the distance the vehicle has traveled after the stopping means therefor has been applied comprising a housing; a drive spur gear on the housing adapted to be connected to said shaft to be driven thereby; a rotary member mounted on the housing and having a gear and indicating means; return spring means for the rotary member to return the member to a predetermined zero position; reduction gearing connected to the gear on the rotary member, said reduction gearing including spur gears; a pivoted arm having a clutch spur gear mounted adjacent one end thereof and movable about the pivot for the arm from a retracted position into a driving position connecting the drive spur gear and a spur gear in the reduction gearing; and electromagnetic means actuated by the stopping means and acting on the arm to move the clutch gear to engaging position to drive the rotary member when the stopping means is actuated.

14. A device for connection to a rotatable wheel driven shaft in a vehicle for indicating the distance the vehicle has traveled after the stopping means therefor has been applied comprising a housing; a spur gear on the housing adapted to be connected to said shaft to be driven thereby; a rotary member mounted on the housing and having thereon a mutilated spur gear and indicating means; return spring means connected to the rotary member to return the member to a predetermined zero position, said mutilated gear limiting rotation of the rotary member to less than one full revolution; reduction gearing including a plurality of spur gears connected to the mutilated spur gear on the rotary member; a clutch spur gear movable from a retracted position into engagement with the drive gear and a spur gear in the reduction gearing; and electromagnetic means actuated by the stopping means and adapted to move the clutch gear into engaging position to drive the rotary member from the drive gear when the stopping means is actuated, rotation of the clutch gear by the drive gear upon deenergization of the electromagnetic means causing said clutch gear to be thrown out of engagement with said reduction gear and permitting the return spring to reset the indicator to zero.

References Cited in the file of this patent

UNITED STATES PATENTS

| | | |
|---|---|---|
| 2,298,065 | Meshberg | Oct. 6, 1942 |
| 2,340,403 | Morley | Feb. 1, 1944 |